T. McMullin,
Belt Fastener.
No. 81,391. Patented Aug. 25, 1868.
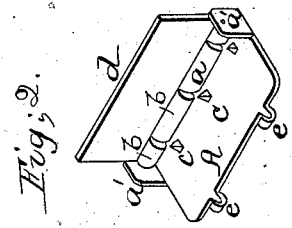
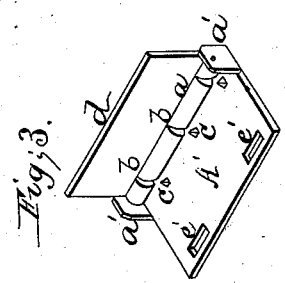
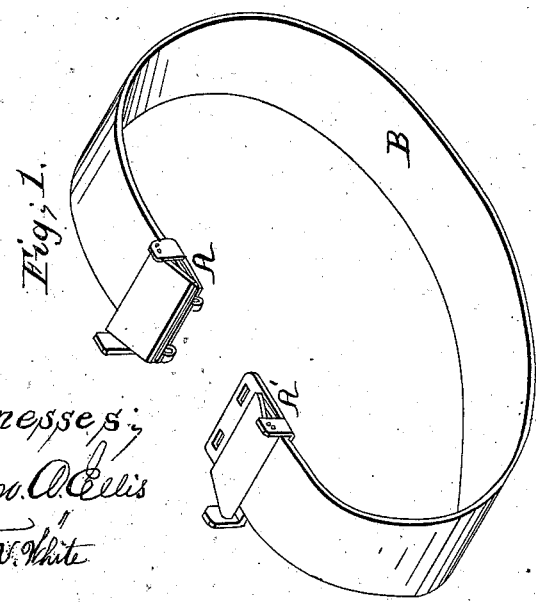
Witnesses:
Jno. A. Ellis
J. V. White
Inventor;
Thos. McMullin
per J. T. Alexander
Atty

United States Patent Office.

THOMAS McMULLIN, OF OSGOOD, INDIANA, ASSIGNOR TO HIMSELF AND MILES MENDENHALL, OF SAME PLACE.

Letters Patent No. 81,391, dated August 25, 1868.

IMPROVEMENT IN COUPLING-BELTS.

The Schedule referred to in these Letters Patent and making part of the same.

TO ALL WHOM IT MAY CONCERN:

Be it known that I, THOMAS McMULLIN, of Osgood, in the county of Ripley, and State of Indiana, have invented certain new and useful Improvements in Coupling-Belts; and I do hereby declare that the following is a full, clear, and exact description thereof, reference being had to the accompanying drawings, and to the letters of reference marked thereon, which form a part of this specification, in which—

Figure 1 represents a view in perspective of a belt with my improved coupling attached.

Figures 2 and 3 are views in perspective of the coupling detached, and

Figure 4 a section, on an enlarged scale, of the coupling as connected for operation.

The object of my invention is to provide a simple and efficient coupling for belts, whereby the labor and loss of time involved in lacing are obviated, and the belts can be tightened or slackened as desired, without cutting them, to which end my improvements consist in attaching to each end of the belt a plate on which an eccentric-roller is pivoted, having grooves formed in it immediately above prongs upon the plate, the end of the belt being clamped between the grooves and prongs when the roller is rotated, so as to press upon it, the plates being connected by suitable hooks and slots.

In the accompanying drawings, A A' represent plates, which are to be attached to the ends of a belt to be coupled. Rollers, $a$, are mounted eccentrically in lugs $a'$ formed upon the plates A A', having V-shaped grooves, $b$, cut in them, said grooves being made in that part of their peripheries which is furthest from their centres of rotation, or, in other words, at right angles to their radii of eccentricity. Pointed prongs, $c$, are secured to the plates A A', immediately beneath the centre lines of the rollers $a$. Plates or levers, $d$, are secured to the rollers $a$, opposite to the grooves $b$, by means of which they can be turned. The plate A is provided with hooks, $e$, which engage in slots, $e'$, in the plate A', by means of which the two plates are connected after they have been clamped to the belt. B represents the belt.

The operation of the device is as follows: The rollers $a$ being turned by the plates $d$ until the grooves $b$ are uppermost, the plates A A' are slipped upon the ends of the belt to be coupled, the end of the belt passing over the prongs $c$ and beneath the roller $a$.

The rollers are then rotated, by means of the plates $d$, until they clamp the ends of the belt between their grooves $b$ and the prongs $c$, by reason of being mounted eccentrically in their bearings. The plates A A' are then connected by the hooks $e$ and slots $e'$.

It will be seen that my improvement furnishes a simple and durable coupling, which will enable the belt to be readily tightened or slackened as desired, without the labor and loss of time involved in lacing, and without requiring the belt to be cut.

What I claim, and desire to secure by Letters Patent, is—

The combination of the eccentric-rollers $a$, furnished with V-shaped grooves $b$, with the plates A A' and prongs $c$, when arranged and operating as and for the purpose set forth.

In testimony that I claim the foregoing as my own, I affix my signature in presence of two witnesses.

THOS. McMULLIN.

Witnesses:
MILES MENDENHALL, Jr.,
THOMAS CAIN.